United States Patent [19]
Weber

[11] 3,926,272
[45] Dec. 16, 1975

[54] CRAWLER TRACK EQUIPPED VEHICLE PALLET WITH WHEEL SUPPORT DRIVE ROLLERS

[76] Inventor: Alman A. Weber, 14926 Broadgreen, Houston, Tex. 77024

[22] Filed: Oct. 30, 1974

[21] Appl. No.: 519,284

[52] U.S. Cl. ................................. 180/1 C; 214/85
[51] Int. Cl.² .......................................... B62D 55/08
[58] Field of Search .................... 180/5 R, 1 C, 6.7; 280/34 R; 214/85

[56] References Cited
UNITED STATES PATENTS

| 2,782,076 | 2/1957 | Miller | 214/85 |
| 2,812,081 | 11/1957 | Schrader | 180/1 C |
| 3,306,175 | 2/1967 | Ferwerda | 180/1 C |

FOREIGN PATENTS OR APPLICATIONS

| 571,803 | 12/1922 | France | 180/1 |

Primary Examiner—Philip Goodman
Assistant Examiner—John A. Carroll
Attorney, Agent, or Firm—Clarence A. O'Brien; Harvey B. Jacobson

[57] ABSTRACT

An elongated vehicle supporting pallet structure is provided and includes opposite side longitudinally arranged crawler track assemblies for support of the pallet structure from a soft ground surface. The pallet structure includes at least one pair of opposite side sets of rotatably supported transverse rollers with each set of rollers including a pair of rollers spaced apart longitudinally of the pallet structure and defining an upwardly opening wheel cradling recess therebetween for cradling the lower peripheral portions of an associated vehicle drive wheel therein with the drive wheel supported from and disposed in driving engagement with the rollers. A drive train drivingly connects at least one roller of each set of rollers to the corresponding crawler track assembly and each of the crawler track assemblies includes an independently operable brake assembly. The pallet structure includes upper surface portions for supporting a wheeled vehicle therefrom including a pair of opposite side drive wheel assemblies driven from a differential assembly and with the drive wheel assemblies of the wheeled vehicle supportively cradled and driven by the corresponding set of pallet assembly rollers. The brake assemblies include hydraulic cylinder actuators each operatively connected to the corresponding brake assembly by means of a flexible hydraulic hose or line for portability of the actuators and to enable the latter to be supported in the operator's cab of a wheeled vehicle supported from the pallet structure. Also, the hydraulic cylinder actuators for the brake assemblies are provided with foot treadle actuated operator portions.

8 Claims, 5 Drawing Figures

U.S. Patent  Dec. 16, 1975  3,926,272
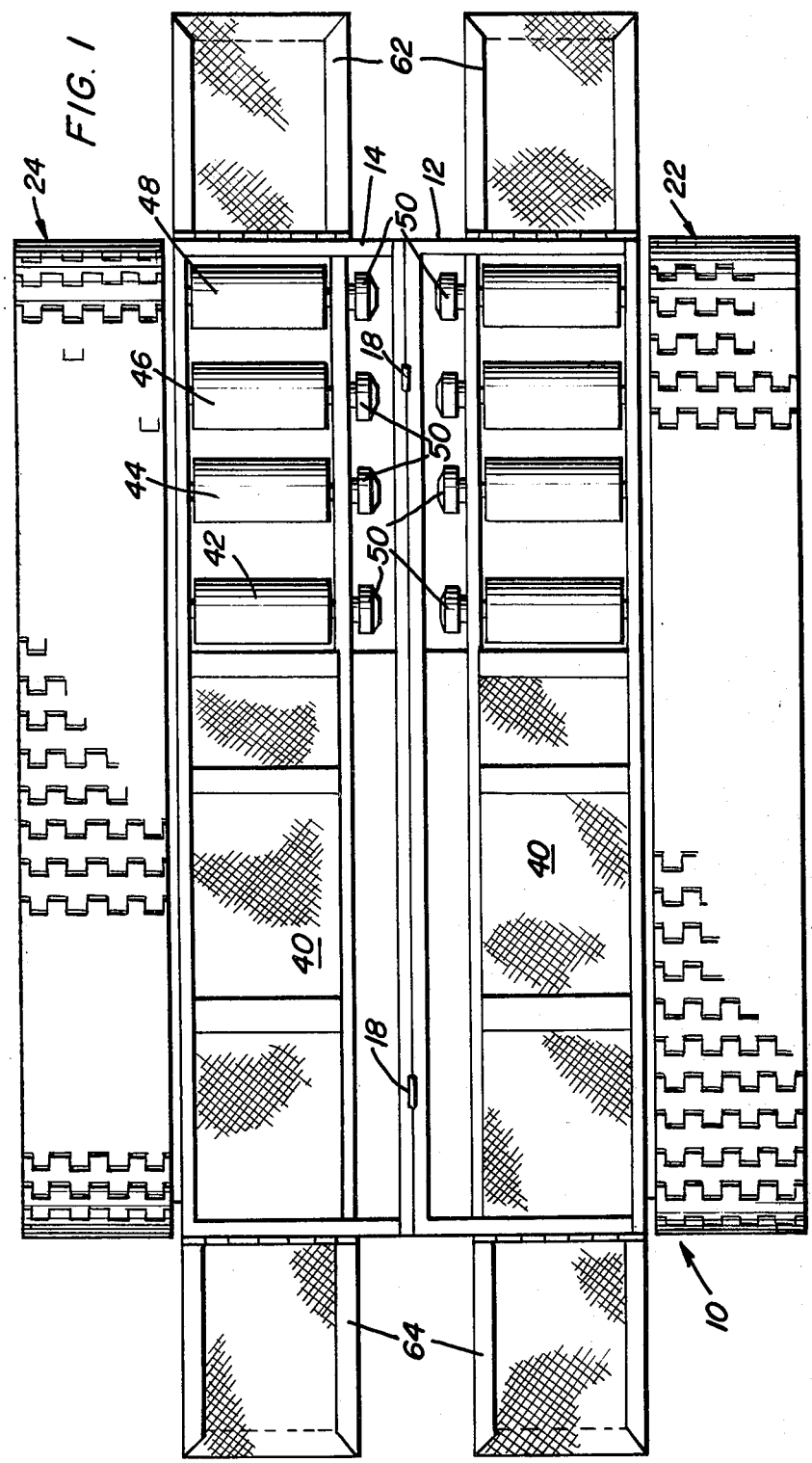
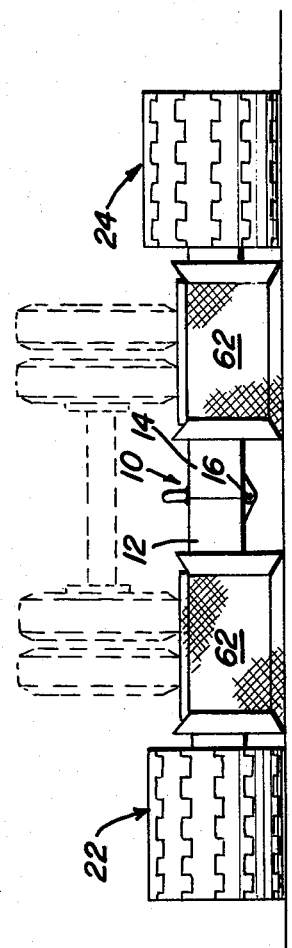

U.S. Patent   Dec. 16, 1975   Sheet 2 of 2   3,926,272
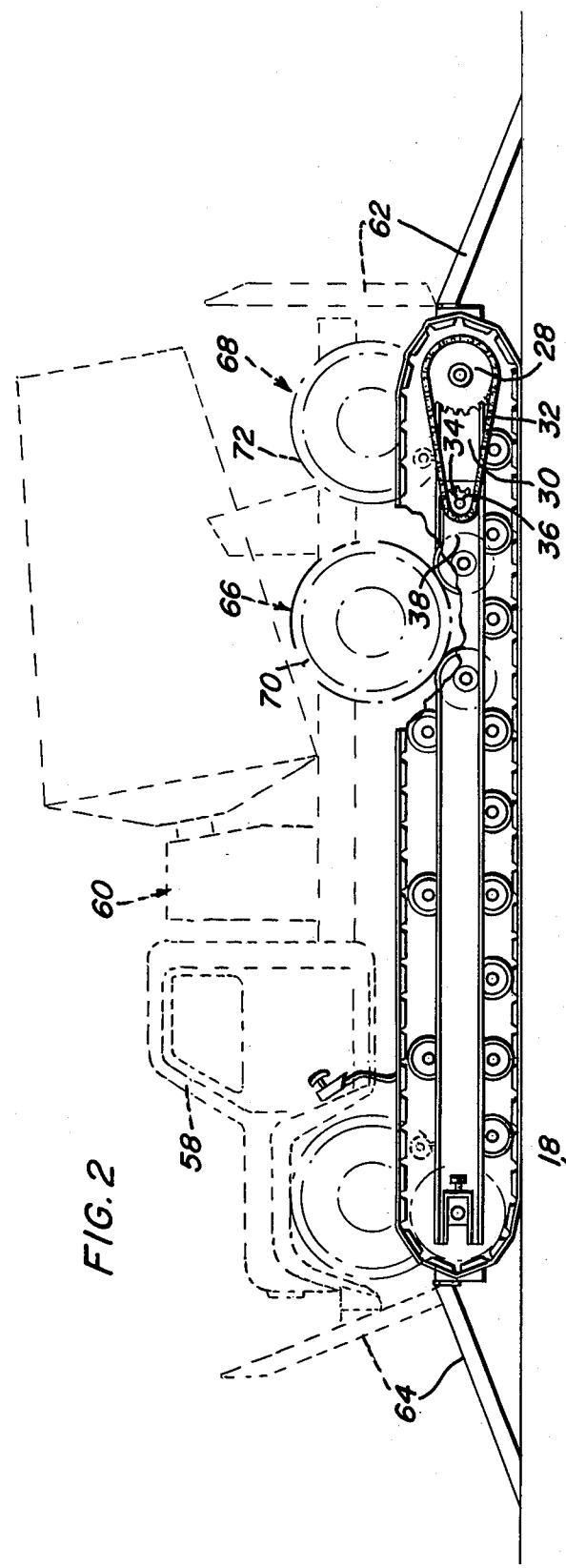
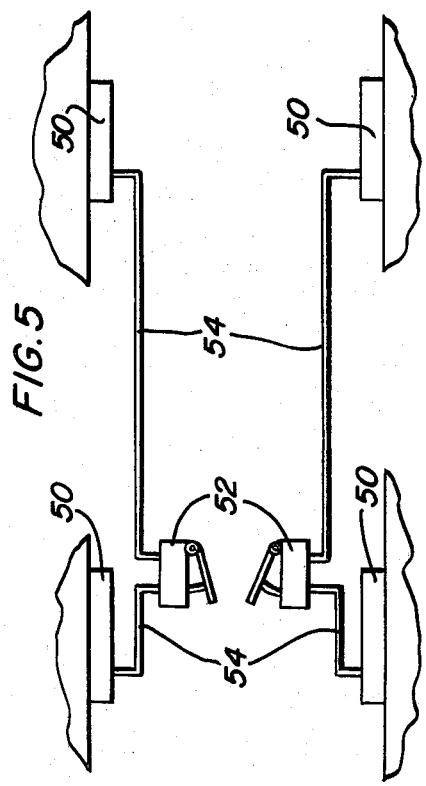
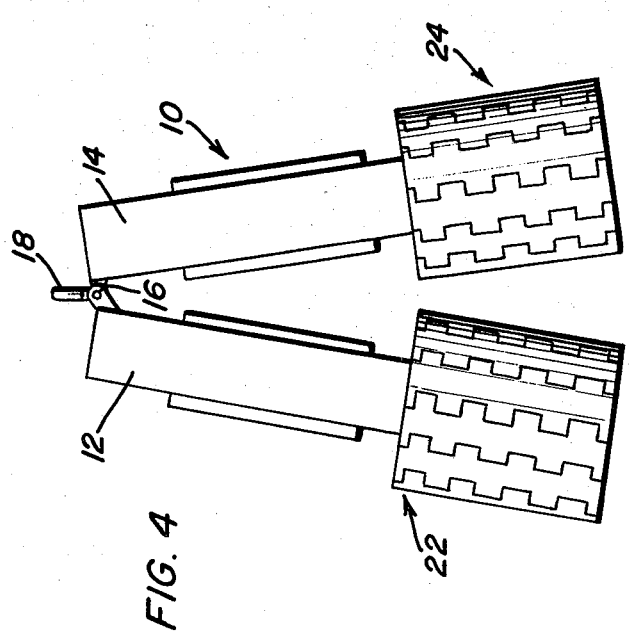

3,926,272

CRAWLER TRACK EQUIPPED VEHICLE PALLET WITH WHEEL SUPPORT DRIVE ROLLERS

BACKGROUND OF THE INVENTION

There are many instances wherein wheeled construction vehicles such as dump trucks and also construction supportive vehicles such as cement trucks must travel over soft ground surfaces at a construction site. These types of vehicles are often heavily loaded and thus are subject to becoming stuck and unable to move under their own tractive power while being operated on soft ground surfaces. When a heavily laden vehicle of this type becomes stuck in mud or on soft ground surfaces, tow cables must be connected between the stuck vehicle and a distant similar vehicle disposed on more solid ground in order to pull the stuck vehicle up onto firmer ground surfaces. Further, in many instances a construction vehicle will become mired in mud or stuck on soft ground surfaces in a manner such that a similar wheeled construction vehicle may not be used as a tow vehicle and in such instances a tow or push by a bulldozer is required. The pushing of a stuck vehicle by a bulldozer can sometimes result in damage to the rear of the stuck vehicle and the pulling of a stuck vehicle either by a bulldozer or by another wheeled construction vehicle can consume considerable man hours in labor as well as downtime of the stuck vehicle and the towing vehicle. In addition, stuck vehicles are often immobilized in a position which halts all other similar vehicular traffic resulting in still further losses of man hours and operating time of other vehicles whose passage is blocked by a stuck vehicle.

SUMMARY OF THE INVENTION

The pallet structure of the instant invention is elongated and provided with retractable wheeled vehicle ramps at its opposite ends whereby a wheeled vehicle may be driven up onto one end of the pallet, along the pallet and off the other end of the pallet. Further, the pallet is equipped with opposite side longitudinally arranged crawler track assemblies for support of the pallet from a soft ground surface and opposite side portions of the pallet having longitudinally spaced transverse rollers journaled therefrom for cradling the lower peripheral portions of the drive wheels of an associated wheeled vehicle with the drive wheels of the vehicle supported from the rollers and drivingly engaged therewith. The opposite side rollers of the pallet are connected by means of a drive train to the corresponding opposite side crawler track assemblies and the latter includes independently operable brake assemblies including portable actuators therefor which may be foot operated and disposed within the driver's cab of a vehicle operatively disposed on the pallet. In this manner, with the driving wheels of the associated construction vehicle being driven through a differential assembly as is conventional, the construction vehicle may be placed in gear and operated to drive the crawler track assemblies of the pallet structure and the independently operable brake assemblies may be selectively actuated to steer the crawler track equipped vehicle pallet in the same manner in which a conventional bulldozer is steered. Thus, heavy wheeled construction vehicles may be moved over soft ground surfaces without fear of becoming stuck.

The main object of this invention is to provide a crawler track equipped vehicle pallet with the crawler track assemblies of the pallet being driven from rollers journaled from the pallet assembly which cradle and support the lower peripheral portions of the drive wheels of the associated vehicle.

Another object of this invention, in accordance with the immediately preceding object, is to provide a vehicle pallet structure equipped with independently operable brake assemblies for the opposite side crawler track assemblies of the pallet whereby the pallet may be steered in the conventional manner in which the bulldozer or similar vehicle is steered.

Still another object of this invention is to provide a vehicle pallet in accordance with the preceding object and including retractable vehicle ramps at its opposite ends whereby an associated wheeled vehicle may be readily driven up onto one end of the pallet and then off the other end of the pallet after the crawler track assembly has been utilized to transport the wheeled vehicle over a soft ground area.

A further important object of this invention is to provide a pallet assembly constructed in a manner whereby it may be readily transported from one construction site to another in a collapsed position.

A final object of this invention to be specifically enumerated herein is to provide a vehicle pallet structure in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of the pallet assembly of the instant invention;

FIG. 2 is a side elevational view of the assemblage illustrated in FIG. 1 and with portions thereof broken away and a construction vehicle illustrated in phantom lines in position supported from the pallet structure;

FIG. 3 is an end elevational view of the pallet assembly as seen from the rear end thereof;

FIG. 4 is an end elevational view of the pallet structure in a folded condition; and FIG. 5 is a fragmentary schematic view illustrating the hydraulic braking assembly of the pallet assembly.

DETAILED DESCRIPTION OF THE INVENTION

Referring now more specifically to the drawings, the numeral 10 generally designates the pallet assembly of the instant invention. The assembly 10 includes a pair of opposite side half sections 12 and 14 abuttingly engaged with each other along adjacent sides and pivotally coupled together as at 16 for relative oscillation about a longitudinal axis extending generally along the centerline of the pallet assembly 10. The half sections 12 and 14 are swingable between the operative positions thereof illustrated in FIGS. 1-3 of the drawings and the folded positions thereof illustrated in FIG. 4 of the drawings, the assembly 10 including a pair of longitudinally spaced center lifting eyes 18 whereby the pallet assembly 10 may be readily lifted by a crane to swing the sections 12 and 14 to the folded positions thereof illustrated in FIG. 4 of the drawings and to thereafter load the pallet assembly 10 on a suitable transporting vehicle while in the folded position.

The remote side marginal portions of the sections 12 and 14 include conventional crawler track assemblies referred to in general by the reference numerals 22 and 24 and each crawler track assembly 22 and 24 includes a rear drive sprocket 28 driven from a transmission 30 by means of a chain 32 trained about the drive sprocket 28 and a sprocket wheel 34 mounted on the output shaft 36 of the associated transmission 38.

Each of the half sections 12 and 14 also includes a longitudinally extending inboard vehicle supporting section 40 of any suitable structure and each section 40 includes four transversely extending rollers 42, 44, 46 and 48 spaced apart along the rear end of the pallet assembly and journaled from the corresponding half section.

The rollers 42 and 46 journaled from each half section 12 and 14 comprise drive rollers which are drivingly connected to the corresponding transmission 38 and each roller 42, 44, 46 and 48 includes a hydraulic brake assembly 50 operatively associated therewith. The brake assemblies 50 on each section 12 and 14 include a foot treadle actuated operator 52 connected thereto by means of suitable flexible hydraulic lines 54 and thus the foot treadle actuated operators 52 may be positioned within the cab 58 of a construction vehicle referred to in general by the reference numeral 60 disposed on the pallet assembly 10 for actuation by the feet of the driver of the vehicle 60.

The rear ends of the vehicle support sections 40 include upwardly swingable ramp assemblies 62 whereby the vehicle 60 may be driven up onto the rear end of the pallet assembly 10 and the front ends of the vehicle support sections 40 include pivotally supported ramps 64 whereby the vehicle 60 may be driven off the front end of the pallet assembly 10.

From FIG. 3 of the drawings it may be seen that the vehicle supporting sections 40 are disposed at a lower elevation than the upper surface portions of the crawler track assemblies 22 and 24 and the retracted positions of the ramps 62 and 64 may be noted in FIG. 2 as represented by phantom lines.

The vehicle 60 includes tandem axle assemblies 66 and 68 and the axle assemblies 66 and 68 are driven from the engine (not shown) of the vehicle 60 through differential assemblies (not shown). The axle assemblies 66 and 68 include opposite side drive wheel assemblies 70 and 72, respectively, and each drive wheel assembly 70 comprises a dual wheel assembly and has the lower peripheral portions thereof supported from and drivingly engaged with the rollers 42 and 44. In addition, the wheel assemblies 72 of the axle assembly 68 comprise dual wheel assemblies and are supported from the rollers 46 and 48.

In operation, when it is desired to drive the vehicle 60 across soft ground, the pallet structure 10 is positioned at one peripheral edge portion of the soft ground and the vehicle 60 is driven up onto the pallet assembly 10 while the rollers 42, 44, 46 and 48 are braked. After the vehicle 60 has been positioned as illustrated in phantom lines in FIG. 2 of the drawings with the wheel assemblies 70 and 72 supported from and drivingly engaged with the rollers 42, 44, 46 and 48 the brake assemblies 50 may be released and the vehicle 60 may be placed in low gear in order to drive the rollers and thus the crawler track assemblies 22 and 24. When it is desired to steer the vehicle pallet assembly 10, one of the brake operators 52 is actuated within the cab 58 of the vehicle 60 by the driver of the vehicle 60 in order to cause the pallet assembly to turn toward that side of the assembly 10. When the pallet assembly has been utilized to transport the vehicle 60 across the soft ground, the front ramp 64 may be lowered to the ground and the vehicle 60 may be driven from the pallet assembly 10 after the brakes 50 have again been actuated with the operators 52 for the brakes 50 being disposed exteriorly of the vehicle 60. As soon as the vehicle 60 has been driven from the pallet assembly 10, another vehicle may be placed thereon. However, if it is desired that the pallet assembly 10 again transport the vehicle 60 back across the soft ground area, the vehicle 60 may be returned to the pallet assembly and back into position thereon and then operated in reverse over the soft ground to be traversed by the vehicle 60.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An elongated vehicle pallet including opposite side longitudinally arranged crawler track assemblies for support of said pallet from a soft ground surface, said pallet including at least one pair of opposite side sets of journaled transverse rollers with each set of rollers including a pair of transverse rollers spaced apart longitudinally of said pallet and defining an upwardly opening cradle recess for cradling the lower peripheral portions of an associated drive wheel therein with said drive wheel supported from and disposed in driving engagement with said rollers, means drivingly connecting at least one roller of each set of rollers to the corresponding crawler track assembly, said crawler track assemblies each having an independently operable brake assembly operatively associated therewith, said pallet including upper surface portions adapted to support a wheeled vehicle therefrom including a pair of opposite side drive wheel assemblies driven from a differential assembly and with said drive wheel assemblies cradled by said sets of rollers and, said brake assemblies including hydraulic cylinder actuators each operatively connected to the corresponding brake assembly by means of a flexible hydraulic hose for portability of said actuators and to enable the latter to be supported in the operator's cab of a wheeled vehicle supported on said pallet.

2. The combination of claim 1 wherein the opposite ends of said pallet include ramp means operatively associated therewith for driving a wheeled vehicle up onto one end of the pallet, along the latter and off the other end thereof.

3. The combination of claim 1 wherein each of said pallet includes two longitudinally spaced sets of rollers drivingly connected to the corresponding crawler track assembly, the two sets of rollers on each side of said pallet being adapted to supportingly cradle the corresponding wheels of a tandem drive axle assembly equipped wheeled vehicle.

4. The combination of claim 1 wherein the opposite ends of said pallet include ramp means operatively associated therewith for driving a wheeled vehicle up onto one end of the pallet, along the latter and off the other end thereof, said ramp means being pivotally supported from opposite end portions of said pallet.

5. The combination of claim 1 wherein, said actuators each are provided with a foot treadle actuated operator.

6. The combination of claim 5 wherein each side of said pallet includes two longitudinally spaced sets of rollers drivingly connected to the corresponding crawler track assembly, the two sets of rollers on each side of said pallet being adapted to supportingly cradle the corresponding wheels of a tandem drive axle assembly equipped wheeled vehicle.

7. The combination of claim 6 wherein said pallet includes a pair of opposite side sections thereof from which the corresponding sets of rollers are journaled, said opposite side sections being pivotally joined together for relative angular displacement about a longitudinal axis generally centered relative to the opposite side portions of said pallet between operative positions with said opposite side sections generally coextensive when in folded positions with said side sections disposed in folded side-by-side relation.

8. An elongated vehicle pallet including opposite side longitudinally arranged crawler track assemblies for support of said pallet from a soft ground surface, said pallet including at least one pair of opposite side sets of journaled transverse rollers with each set of rollers including a pair of transverse rollers spaced apart longitudinally of said pallet and defining an upwardly opening cradle recess for cradling the lower peripheral portions of an associated drive wheel therein with said drive wheel supported from and disposed in driving engagement with said rollers, means drivingly connecting at least one roller of each set of rollers to the corresponding crawler track assembly, said crawler track assemblies each having an independently operable brake assembly operatively associated therewith, said pallet including upper surface portions adapted to support a wheeled vehicle therefrom including a pair of opposite side drive wheel assemblies driven from a differential assembly and with said drive wheel assemblies cradled by said sets of rollers and, said pallet including a pair of opposite side sections thereof from which the corresponding sets of rollers are journaled, said opposite side sections being pivotally joined together for relative angular displacement about a longitudinal axis generally centered relative to the opposite side portion of said pallet between operative positions with said opposite side sections generally coextensive when in folded positions with said side sections disposed in folded side-by-side relations.

* * * * *